UNITED STATES PATENT OFFICE 2,211,938

MODIFIED ALKYD RESIN

Israel Rosenblum, New York, N. Y.

No Drawing. Application July 3, 1937,
Serial No. 151,844

12 Claims. (Cl. 260—22)

My invention relates to the production of oil acid-modified alkyd resins, and more particularly to resins of this type which contain a resinifying dibasic aliphatic acid, that is, an acid or acids which react with glycerol to form resins, and especially maleic acid.

It is the object of the invention to provide resins of the kind indicated which are insensitive or inert, or have a reduced sensitivity or reactivity, towards basic pigments, such as zinc oxide. Other objects of the invention will appear from the following description.

In my United States Patents Nos. 2,004,880, dated June 11, 1935; 2,063,854, dated Dec. 8, 1936; 2,063,855, dated Dec. 8, 1936; 2,063,856, dated Dec. 8, 1936; and 2,081,154, dated May 25, 1937, there are described various processes for the manufacture of oil acid-modified alkyd resins containing dibasic aliphatic acids of the type which ordinarily produce a non-homogeneous system when heated simultaneously with glycerol and a considerable proportion of fatty oil acids (say about 1 mol for each mol of dibasic acid), said resins being prepared with or without phthalic acid and with or without other acidic materials like boric acid and phenol-formaldehyde-rosin condensates. The use of the dibasic aliphatic acids, particularly with phthalic acid, is highly advantageous, even when only small amounts of the former are used. Thus in the case of maleic acid, the use of this acid in amounts as small as 3-10% of the phthalic acid content results in a very considerable reduction in the reaction time required to produce a resin of high viscosity in solution in organic solvents, especially in the longer oil type alkyds, and results further in improvement in the color of the resin (i. e., paleness), and in greater adhesion and hardness of film. The maleic acid content may, however, be higher, for example, equimolecular with reference to the phthalic or even still higher.

While the resins so obtained are highly satisfactory for use with neutral or inactive pigments, such as titanium dioxide, they frequently exhibit an excessive degree of reactivity towards mixtures of basic and inert pigments unless excessive amounts of glycerol are used, in which case the drying properties and hardness of the film become non-satisfactory and in addition, the reaction time for the process is increased. Thus with a pigment containing 20% of zinc oxide and 80% titanium dioxide or similarly inert pigment or pigments, a gradual reaction takes place at room temperature which causes the coating composition containing such pigment and an oil acid-modified alkyd resin containing a dibasic aliphatic acid, and particularly maleic acid, to thicken or even to "liver" up to a thick semi-gelled mass. While, of course, many paints and enamels do not contain basic pigments and can be safely used with the described modified alkyd resins, there are certain cases in which it is desirable to employ zinc oxide in the pigment in order to obtain improved properties, such as better flow and brushing, non-chalking, a harder film, etc.

I have discovered that without changing the formulation or composition of the alkyd resin, and without, in particular, giving up the use of maleic acid or anhydride which, even when present in relatively small proportion, exerts a very decided and desirable influence upon the speed of the reaction and upon the properties of the finished resin, this excessive reactivity can be overcome to a great extent and for practical purposes even completely, by preheating the fatty oil acids in the absence of the other reacting materials. This preheating may be accomplished in the following manner.

The fatty oil acid of commerce, such as linseed oil fatty acids or soya bean oil fatty acids, is heated by itself at a temperature of about 230° C. for about 4 to 6 hours. Higher temperatures can, of course, be employed for a shorter period of time. It is advisable to keep an atmosphere of inert gas over the oil acids during this heating. Several changes occur in the physical and chemical properties of the fatty acids. Thus, in the case of linseed oil fatty acids, the density increases from about 0.90 to about 0.91, and the acid number falls about 8 to 12 points from the original value of about 200. Care should be taken not to decrease the acid value too greatly, as the drying properties of the finished resin may then be prejudiced. There is, however, a further and more important change in the properties of the fatty oil acids as a result of this heating, and this change, which appears to be molecular in nature, probably producing high molecular weight acids resulting in a reduction in the acid value, accounts for the surprising result that when the acid is reacted, for example, with phthalic anhydride, maleic anhydride and glycerol, either in a one step operation or in several steps, the obtained resinous product is practically completely non-reactive toward pigments containing as much as 20% of basic material, whereas resins of the same composition, but in which the fatty oil acids have not been preheated, yield products which body up or liver with pigment mixtures containing basic pigments.

In addition to the reduction of the reactivity, which enables pigments containing as much as 20% and even more of zinc oxide to be employed in paints and enamels without appreciably affecting the stability of the coating composition on long storage, the preheating of the fatty oil acids brings about also a further shortening of the reaction time over the reduced period of reaction already effected by the use of, for example, maleic anhydride. Alkyd resins of the type above-described, and particularly oil-soluble alkyd resins, can thus be obtained with the desired degree of viscosity in a relatively short period of time, thereby reducing the cost of manufacture and favoring the production of pale resins because of the reduced reaction period.

It will thus be seen that whereas previously the use of a considerable proportion of those dibasic aliphatic acids (such as maleic acid) which, when heated simultaneously with equimolecular proportions of glycerol and fatty oil acids, produced a non-homogeneous system which was entirely useless for the production of coating compositions, made it necessary (when such acids were employed in such quantities or in such order of reaction that a homogeneous system resulted, as set forth in my above named patents) to stop the reaction while the acid number of the product, or its reactivity toward pigments containing basic substances, was relatively high, the present invention makes it possible to reduce such acidity or reactivity. At the same time, not only is the capacity of maleic acid for reducing the reaction time, or advancing the stage at which the desired viscosity is reached, retained but the reaction time may be even further decreased by the preheating of the fatty oil acids; similarly, the tendency of the maleic acid to yield resins which are pale in color is likewise preserved.

The invention will be further described with the aid of the following examples which are presented for purposes of illustration only.

Example 1

Commercial linseed oil fatty acids were heated at temperatures of about 230° C. for about 4 to 6 hours. These preheated acids were then employed for the production of an alkyd resin as follows:

| | Grams |
|---|---|
| Preheated linseed oil fatty acid | 450 |
| Phthalic anhydride | 300 |
| Glycerine | 215 |
| Maleic anhydride | 15 | were heated at 250° for about 10 hours. The finished plastic resin, when dissolved 1:1 in varnolene, had the desired viscosity of Y on the Gardner-Holdt scale and the low acid value of 5. This solution, when used as a vehicle for an enamel, the pigment of which consisted of 80% titanium oxide and 20% zinc oxide, showed no reactivity toward the pigment and practically no thickening took place on prolonged storage.

Example 2

Soya bean oil fatty acids were preheated in the manner above-described and were then employed in the following reaction:

| | Grams |
|---|---|
| Preheated soya bean oil fatty acid | 600 |
| Phthalic anhydride | 400 |
| Glycerine | 285 |
| Maleic anhydride | 24 | were heated as in Example 1, a plastic resin was obtained, the 1:1 varnolene solution of which had viscosity Y, and the still lower acid value of 3.5. Used as a vehicle for an enamel with the same pigment content as in Example 1 it proved to be non-reactive, no thickening at all being produced, while a non-yellowing film of remarkable color-retention was obtained therewith.

Example 3

| | Grams |
|---|---|
| Preheated soya bean oil fatty acids | 420 |
| Phthalic anhydride | 148 |
| Glycerol | 129 |
| Maleic acid | 23 | were heated at about 250° C. from 12 to 15 hours. The pre-heating of the fatty acids was conducted in the manner described hereinabove, and the same is true of the fatty acids employed in Examples 4 and 5 hereinbelow. The finished resin had a desirably high viscosity in solution and an acid number of about 4. The resin showed no reactivity toward zinc oxide.

Example 4

| | Grams |
|---|---|
| Preheated soya bean oil fatty acids | 560 |
| Phthalic anhydride | 148 |
| Glycerol | 147 |
| Maleic acid | 35 | were heated at about 250° C. for 15 to 20 hours. A highly viscous resin was obtained which showed no signs of gelling or livering with pigments containing zinc oxide.

Example 5

| | Grams |
|---|---|
| Preheated linseed oil fatty acids | 300 |
| Phthalic acid | 300 |
| Glycerol | 300 |
| Maleic acid | 15 | were heated at about 190° for about ½ hour and the temperature was then raised to about 230° C. and maintained thereat until a sample removed from the reaction mass was found to be soluble in toluol in substantially all proportions. The resin so obtained produces no livering with pigment mixtures containing zinc oxide and is characterized particularly by baking pale with white pigments and by unusual adhesiveness upon smooth metallic surfaces, including tin surfaces.

If desired, soluble phenol-formaldehyde resins, and particularly phenol-formaldehyde condensates produced in the presence of a natural resin, can be incorporated in the reacting mixture, as described in my United States Patent No. 2,081,154. Boric acid may also be added as one of the reacting substances either with or without the phenolic resins.

The preheating of the fatty oil acids is of advantage also in the two step process described in my above-mentioned Patents Nos. 2,063,854 and 2,063,855, in which glycerol is reacted first with the fatty oil acids to produce partial glycerol esters, which are then reacted with dibasic aliphatic acids. The latter acid may be employed without the simultaneous use of phthalic acid, or the phthalic acid may be present in any desired proportion. After the heating of the fatty oil acids by themselves, the subsequent reactions resulting in the production of the alkyd resin may be conducted in a single stage or in any desired order which will yield a homogeneous resinous product.

When the resins are of sufficient oil length they are compatible with varnish oils, and they may be mixed also with various resins and varnishes.

Where the use of phthalic acid is indicated above, such acid may be in part replaced by other dibasic acids. The fatty oil acids may be derived from drying, semi-drying and non-drying oils, in addition to linseed and soya bean oil; for example, the acids of sunflower, rapeseed, cottonseed, castor, perilla, tung, poppyseed, etc., oils may be employed or mixtures of such acids. The proportions of the reacting substances may be varied within rather wide limits and the glycerol may be replaced in whole or in part by other polyhydric alcohols, such as polyglycerols. Other variations from the specific procedures above-described will suggest themselves to those skilled in the art within the scope of the appended claims without departing from the spirit of the invention.

I claim:

1. The method of producing oil acid-modified alkyd resins containing combined resinifying dibasic aliphatic acid of the type which forms a permanently non-homogeneous system when heated simultaneously with approximately equimolecular proportions of glycerol and fatty oil acids, which comprises first heating fatty oil acids by themselves to a temperature of about 230° C. for at least 4 hours to cause such modification of the acids that upon subsequent reaction with glycerol and resinifying dibasic acid material composed at least in part of the said dibasic aliphatic acid, a resinous material is obtained which is substantially non-reactive toward pigments containing basic material and is substantially stable on storage, and then reacting said modified acids with the said resinifying acid material and glycerol until a homogeneous resinous reaction product is obtained.

2. The method according to claim 1 wherein the fatty oil acids are the acids of linseed oil and the dibasic aliphatic acid is maleic acid.

3. The method according to claim 1 wherein the pre-heated fatty acids are reacted simultaneously with glycerol, phthalic anhydride and a relatively small proportion of the dibasic aliphatic acid.

4. The method of producing oil acid-modified alkyd resins containing combined resinifying dibasic aliphatic acid of the type which forms a permanently non-homogeneous system when heated simultaneously with approximately equimolecular proportions of glycerol and fatty oil acids, which comprises heating the acids of a drying oil by themselves at about 230 C. for about 4 to 6 hours to cause such modification of the acids that upon subsequent reaction with glycerol and resinifying dibasic acid material composed at least in part of the said dibasic aliphatic acid, a resinous material is obtained which is substantially non-reactive toward pigments containing basic material and is substantially stable on storage, and then reacting such modified acids with glycerol, phthalic anhydride, and such a proportion of the said dibasic aliphatic acid that all of it will enter into the production of a homogeneous reaction product, said reaction being continued until such reaction product is obtained.

5. The method according to claim 4, wherein the acids of linseed oil are heated themselves until the acid number has fallen by at least 8 points, the total quantity of fatty and dibasic acids being approximately equivalent to that of the glycerol.

6. The method of producing soluble, oil-acid modified alkyd resins containing combined maleic anhydride which comprises first heating the acids of a fatty oil by themselves at a temperature of about 230° C. for at least about 4 hours to cause such modification of the acids that upon subsequent reaction with glycerol and phthalic and maleic anhydrides a resinous material is obtained which is substantially non-reactive toward pigments containing basic material and is substantially stable on storage, and then reacting such preheated acids with glycerol and phthalic and maleic anhydrides in such order that a homogeneous reaction product is obtained.

7. The method according to claim 1 wherein the heating is continued to such an extent that the product, when dissolved 1:1 in varnolene, has an acid value of approximately 5 or below.

8. The method according to claim 1 wherein the dibasic aliphatic acid is maleic anhydride and wherein the heating is carried on to such an extent that the reaction product in 1:1 varnolene solution has a viscosity of approximately Y on the Gardner-Holdt scale and an acid value of approximately 5 or below.

9. An oil-acid-modified alkyd resin containing in chemical combination a dibasic aliphatic acid of the type which forms a permanently non-homogeneous system when heated simultaneously with approximately equimolecular proportions of glycerol and fatty oil acids, said resin being homogeneous in character and being substantially non-reactive toward pigments containing zinc oxide, and being obtained in accordance with the process of claim 1.

10. An oil acid-modified alkyd resin containing maleic anhydride in chemical combination, said resin being homogeneous in character and substantially non-reactive toward pigments containing basic material, and being obtained in accordance with the process of claim 6.

11. The reaction product of pre-heated linseed oil acids, glycerol, phthalic acid or anhydride and a dibasic aliphatic acid of the type which forms a permanently non-homogeneous system when heated simultaneously with equimolecular proportions of glycerol and linseed oil acids, said product being homogeneous in character and substantially non-reactive toward pigments containing basic material, and produced in accordance with the process of claim 6.

12. The soluble resinous product of pre-heated drying oil acids, glycerol, and phthalic and maleic anhydrides, said product having an acid number of the order of 5, being substantially non-reactive toward pigments containing basic material, and produced in accordance with the process of claim 6.

ISRAEL ROSENBLUM.